United States Patent [19]

Liu et al.

[11] Patent Number: 5,998,742
[45] Date of Patent: Dec. 7, 1999

[54] HIGH SPEED HIGH ACCURACY ACTIVE FORCE TRANSDUCER

[75] Inventors: Jyh-Dong Liu, North Olmsted; Imre Andrew Pattantyus-Abraham, Rocky River, both of Ohio; Lin Yang, Rochester, Minn.

[73] Assignee: Eveready Battery Company, Inc., St. Louis, Mo.

[21] Appl. No.: 09/109,501

[22] Filed: Jul. 2, 1998

Related U.S. Application Data

[63] Continuation-in-part of application No. 08/702,891, Aug. 26, 1996.

[51] Int. Cl.⁶ ........................................ G01G 3/14
[52] U.S. Cl. ............................ 177/210 EM; 177/184; 177/256
[58] Field of Search ........................... 177/184, 187, 177/188, 189, 191, 210 EM, 212, 257, 258, 259, 256

[56] References Cited

U.S. PATENT DOCUMENTS

| | | | |
|---|---|---|---|
| 1,282,187 | 10/1918 | Cary | 177/257 |
| 3,684,875 | 8/1972 | Smith et al. | 235/151.33 |
| 3,802,522 | 4/1974 | Thompson et al. | 177/121 |
| 4,004,458 | 1/1977 | Knothe et al. | 73/141 R |
| 4,034,819 | 7/1977 | Akers et al. | 177/210 C |
| 4,100,985 | 7/1978 | Meier | 177/189 |
| 4,153,124 | 5/1979 | Knothe et al. | 177/212 |
| 4,156,472 | 5/1979 | Kunz | 177/25 |
| 4,354,563 | 10/1982 | Luchinger et al. | 177/210 EM |
| 4,420,055 | 12/1983 | Grutzediek et al. | 177/212 |
| 4,553,618 | 11/1985 | Kusmenskji et al. | 177/185 |
| 4,570,729 | 2/1986 | Del Rosso | 177/145 |
| 4,624,331 | 11/1986 | Naito | 177/185 |
| 4,802,541 | 2/1989 | Bator et al. | 177/212 |
| 4,825,968 | 5/1989 | Maaz et al. | 177/212 |
| 4,850,443 | 7/1989 | Bergholt et al. | 177/229 |
| 4,875,534 | 10/1989 | Kunz | 177/212 |
| 5,038,839 | 8/1991 | Morimoto et al. | 141/83 |
| 5,054,566 | 10/1991 | Freeman | 177/184 |
| 5,367,128 | 11/1994 | Tsukasa et al. | 177/212 |

FOREIGN PATENT DOCUMENTS

| | | | |
|---|---|---|---|
| 0564158A2 | 6/1993 | Germany | 177/210 EM |
| 565998 | 7/1975 | Switzerland . | |
| 2 112 147 | 7/1983 | United Kingdom | 177/210 EM |
| 2 112 150 | 7/1983 | United Kingdom | 177/210 EM |
| 2112147A | 7/1983 | United Kingdom | 177/210 EM |
| 2112150A | 7/1983 | United Kingdom | 177/210 EM |
| 0 564 158 | 6/1993 | United Kingdom | 177/210 EM |

*Primary Examiner*—Randy W. Gibson
*Attorney, Agent, or Firm*—Robert W. Welsh

[57] ABSTRACT

A force transducer and method of measuring an applied force such as a weight of material, comprising a balance beam, said balance beam being supported at a preset position on a base at a fulcrum between its two ends, a voice coil actuator comprising an electrically conductive coil and a magnet, the coil being mounted on the base and the magnet being mounted on one side of the fulcrum of the balance beam, a counterbalance mounted on the second side of the fulcrum of the balance beam whereby said balance beam is generally unresponsive to low frequency vibration at the base, a beam position sensor for detecting beam movement from its preset position by a force applied to the beam, a control system associated with the sensor and coil and responsive to the sensor for supplying an electric current through the coil in an amount sufficient to maintain the magnet and thereby the beam at the present position, and a current detector for measuring the amount of current so supplied and thereby the amount of the applied force. According to one embodiment, the conductive coil and magnet are located on the same side as the object to be weighed. A force concentration assembly may further concentrate the force to be weighed to a small-area on said balance beam. According to another embodiment, a double-beam force transducer is provided in which force of an object to be weighed is applied to a pair of balance beams.

25 Claims, 4 Drawing Sheets

HIGH SPEED HIGH ACCURACY ACTIVE FORCE TRANSDUCER

CROSS-REFERENCE TO RELATED APPLICATIONS

This application is a continuation-in-part of U.S. Pat. application Ser. No. 08/702,891, filed Aug. 26, 1996.

BACKGROUND OF THE INVENTION

This invention relates to active force transducers, and more particularly to a beam style active force transducer, and its control and measurement electronics as for high speed high accuracy weighing of material in a production operation, e.g., of filling powders and liquids into containers, or determining the mass weight of an object.

This invention arose from a recognition that modern high speed manufacturing operations, as for assembling small fill containers, would greatly benefit by the capability of rapidly measuring, in a small fraction of a second, the weight of an individual substance or material to be included or incorporated into the assembled product, and to do so with highly accurate results. Such capability would include that of repeatedly measuring the tiny quantities on a production basis.

In order to increase efficiency and the quality of products manufactured on assembly lines, manufacturers are searching for automated methods of monitoring the manufacturing operations as well as the products themselves. As technology advances, assembly line production rates are increasing, requiring more advanced and faster transducers. Commercially available units have a range limit of about 600 grams, plus or minus 50 milligrams, for weight checking.

The accuracy, response time and range are the main characteristics that determine the suitability of a transducer for a particular application. Accuracy and response time are typically functions of the range. In addition, since the potential exists for mechanical vibrations to significantly reduce the achievable accuracy of transducers in manufacturing environments, it is important to design transducers with vibration disturbance rejection.

Thus, a force transducer system with a fast response time, a high level of accuracy, and vibration disturbance rejection characteristics is desirable. The target parameters for such a force transducer are accuracy up to 0.04% of full scale 0.3N, accurate measurement in 0.05 seconds, and accuracy minimally affected by vibrations.

There are many different methods and devices used for measuring force, of which the following are representative of the basic underlying principles for most force transducers. Almost all sensing elements designed to measure force utilize one of two basic principles relating to "elastic force" and "electromagnetic force." Most of these methods and devices are passive.

In instruments utilizing elastic force, the amount of force applied is measured in terms of displacement and deformation of a known elastic member, and is the property exploited in most "force transducing" methods. These instruments, based on the equilibrium of the force on or by the object and the elastic force, are generally referred to as dynamometers, more commonly known as load cells. The working principle of the dynamometer is based on Hooke's law, which is the linear proportional relationship of stress and strain. The strain of the elastic element is measured when subjected to the load of an object, with the force exerted on or by the object being determined. The elastic element ranges from the following: helical elements subjected to compression or twisting (springs); solid or hollow columns working in compression or tension (load cells); circular, square, and flattened rings, working in compression-and-bending or in tension-and-bending; tension bars; shear bars; etc.

There are other systems of force transducers that also use linear functions, like Hooke's law, but in which the force applied modifies some other measurable property of the transducer. Piezoelectric material falls into this category in that, when deformed, it yields an electric charge proportional to the deformation. If the deformation is maintained, however, the charge will gradually decrease. Therefore, piezoelectric transducers are not suitable for static loads. Instead, these materials are utilized in situations where dynamic force characteristics are required.

In instruments utilizing electromagnetic force, the amount of force applied is measured in terms of electric current. Electromagnetic forces are generated by a magnetic field of an electric charge in motion. The generation of electromagnetic forces has been applied in construction of electromagnetic compensation transducers, in which the force of an object is balanced by the electromagnetic force generated by a coil assembly in a magnetic field. The force is determined by the magnitude of the electric current necessary to bring the system to equilibrium.

In the initial stages of the present development project, a voice coil actuator was arranged to receive a direct force by applying an item to be weighed directly to it and attempting to measure the current required to create an equal but opposite force. This was found to have inherent complications that prevent it from being a useful, accurate system. These complications include excessive sensitivity to environmental vibrations even if a vibration isolator is used, inability to keep in calibration, and measurement interference by lead wires to the coil, to name a few. This type of system was therefore discarded as flawed, with further development leading to the invention herein.

A subsequent search revealed a system with an additional complication of a mechanical diaphragm in the form of an annular blade spring. Specifically, U.S. Pat. No. 4,802,541 to Bator et al. describes a weighing scale employing a tray supported on annular blade springs and having a conductive coil movable therewith relative to a fixed magnet. A control system senses a change in position of the tray with applied weight, and causes sufficient current to the coil to return the coil and tray to the original position. This proposed apparatus is considered to have significant shortcomings, however, among which are the non-uniformity and variable characteristics of springs which are used, the undesirable effects of moving coil lead wires on the weighing action, and the limited capacity of vibration isolators to actually isolate the apparatus from low frequency vibration found, for example, in production facilities. Present units employ passive isolation, as contrasted with detecting motion and actively responding with a control system.

Achievable accuracies are usually specified by manufacturers of force transducers. Typical sensors based on elastic elements can achieve approximately 0.25% of full scale, and the best ones are accurate up to 0.05%. Force transducers utilizing electromagnetics are available with accuracies up to 0.00004% of scale. Usually to achieve such accuracy requires a weighing response time of >1.0 second. Certain factors can adversely influence accuracy, however. It was determined by the inventors herein that low frequency vibrations in the range of below about 2 Hertz are highly disruptive of a voice coil actuator system such as in U.S. Pat. No. 4,802,541, since the isolator does not isolate the coil from such vibrations. Such low frequency vibration is common in production facilities, e.g., from stamping presses, so that it presents a significant problem. Also, it has been determined that the drag or weight effects of wire leads on a movable coil disrupt accurate readings. If these effects were not present, the achievable accuracies of "off the shelf" force transducers could easily meet the accuracy requirement, but their response time does not meet the speed requirement. Manufacturers do not generally give specifications for a required time to achieve the given accuracy. Speed claims that are made by manufacturers of force transducers are generally of the nature "responds in about one second with stable readings." The reason for this vagueness is that achieving a high level of speed is dependent on having a controller tuned very accurately for the particular application. Available force transducers are not easily tuned by the user to meet a strict speed requirement for a particular application.

A suitable electromagnetic actuator for an active force transducer application is what is commonly known as a voice coil actuator (VCA). VCAs have been utilized in many advanced motion control systems requiring high acceleration, high frequency actuation and linear force output. In its simplest form, a linear VCA, i.e., linear motor, is a tubular coil of wire located within a radially oriented magnetic field. The field is produced by permanent magnets. The inner core of the magnet along the axial centerline of the coil is used to complete the magnetic circuit. The force generated axially upon the coil when current flows through the coil will produce relative motion between the magnet assembly and the coil. The electromagnetic conversion mechanism of the VCA is governed by the Lorentz Force principle. The direction of current flow through the coil dictates the direction of the axial force, while the magnitude of the force is proportional to current. For precise servo control applications utilizing VCAs, it is required to have a control and power amplifier circuitry and also a feedback device for closed-loop control. Many types of position, velocity, and force transducers can function as feedback devices, as is known. In order to eliminate the potential of static friction, the coil must be centered within the magnet/core gap throughout the entire stroke. It is not necessary to center the coil precisely; however, contact between the coil assembly and magnet assembly must be avoided.

Because the force transducer would be expected to be located in a manufacturing environment, ambient vibrations including low-frequency and high-frequency vibrations from manufacturing operations will be present and need to be precluded from significantly affecting accuracy of the output readings.

Conventional beam style force transducers generally employ relatively large beams which tend to have a large mass and can experience undesirable beam bending moments. In addition, known beam style force transducers can experience excessive beam pivot friction which degrades the accuracy of the force transducers. Further, such conventional beam style transducers often require precise position placement of an object to be weighed on the beam to maintain accuracy.

SUMMARY OF THE INVENTION

An object of this invention is to provide a novel active force transducer apparatus and method, particularly one capable of repeatedly accurately measuring the weight of tiny quantities of material or tiny items in a small fraction of a second, so as to be particularly useful in high speed production operations and facilities, e.g., as for filling of powders and liquids into containers.

Another object of this invention is to provide a novel beam style force transducer apparatus, the output data of which is generally unresponsive to low frequency environmental vibrations because of the very structure itself, thereby being particularly suited to industrial use. Moreover, the apparatus can be conveniently isolated from high frequency vibrations. Thus, the unique structure can be employed as a high speed, accurate weighing system in a manufacturing/production system and environment.

It is also an object of the present invention to achieve a high speed, high accuracy beam style force transducer that experiences very low beam pivoting friction and has enhanced geometric constraints.

A further object of the present invention is to provide a novel beam style force transducer with a reduction in length, a reduction in equivalent mass of the system, and reduced beam bending moment. This can be achieved by providing the voice coil actuator and position transducer at the same side of the balance beam as the weighing object.

Yet another object of the present invention is to provide for a novel beam style force transducer that accurately measures weight of an object independent of the object's position on the beam. This is achieved with a force concentration assembly according to one embodiment and a double-beam assembly according to another embodiment.

The novel apparatus is a force transducer which includes an elongated balance beam supported on a base about a pivot mount assembly between first and second ends of the balance beam. An electrically conductive coil and a magnet are located on the first side of the pivot mount and are capable of providing a force to the balance beam. A counterweight is mounted on the balance beam on the second side of the pivot mount assembly and is arranged on the balance beam to meet a balanced condition. A beam position sensor, preferably located at the other end of the first side of the balance beam, detects balance beam movement from its preset position by a force applied to the balance beam. A receiving pad provided on the balance beam on the first side of the pivot mount assembly receives an object to be weighed. A control system associated with the sensor and the electrically conductive coil is responsive to the sensor for supplying an electric current through the electrically conductive coil in an amount sufficient to maintain the balance beam at the preset position and a current detector measures the amount of current supplied and thereby the amount of force.

According to another embodiment, the force transducer may further include a force concentration assembly that holds the object to be weighed so that the measurement is substantially position independent. The force concentration assembly has a platform mounted on a linear bearing and small-area contact tip for contacting the top surface of the balance beam. An object to be weighed can be placed at various positions on the holding platform and the net force consistently applied to a single point or small area on the balance beam.

According to a multiple-beam embodiment, a double-beam force transducer is provided having a first balance beam with first and second ends and being supported on the base at a first pivot mount assembly between the first and second ends. The double-beam force transducer also has a second balance beam with first and second ends with the second end being supported on the base at a second pivot mount assembly and the first end of the second balance beam contacting the first balance beam. A holding platform is provided for receiving an object to be weighed and applying force to the first balance beam and the second balance beam. The multiple beam force transducer has a counterweight mounted on the first balance beam at one end and a position sensor, preferably located at the other end, detects balance beam movement from its preset position. A control system associated with the sensor and electrically conductive coil is responsive to the sensor for supplying electric current through the coil in an amount sufficient to maintain the balance beam at the preset position and a current detector detects the amount of current supplied and thereby the amount of force. The multiple beam force transducer provides accurate high speed force measurements which are substantially positioned independent of the placement of the object to be weighed on the platform.

In the preferred embodiment, the novel apparatus and method are particularly accurate, rapid, and useful for repeatedly, successively verifying the weight of items or materials having an expected weight value.

These and other objects, advantages and features of the invention will become apparent upon studying the following specification in conjunction with the drawings.

DESCRIPTION OF THE PREFERRED EMBODIMENTS

A primary use of the novel apparatus and method is for rapidly, repeatedly successively measuring the weight of items or material during production operations, the items or material having an expected weight of a predetermined amount. Such use is, e.g., for filling of powders and liquids into containers. The beam style apparatus of this invention may be meaningfully called a high speed weighing system. It could also be used to measure forces other than weight.

Figure 1:
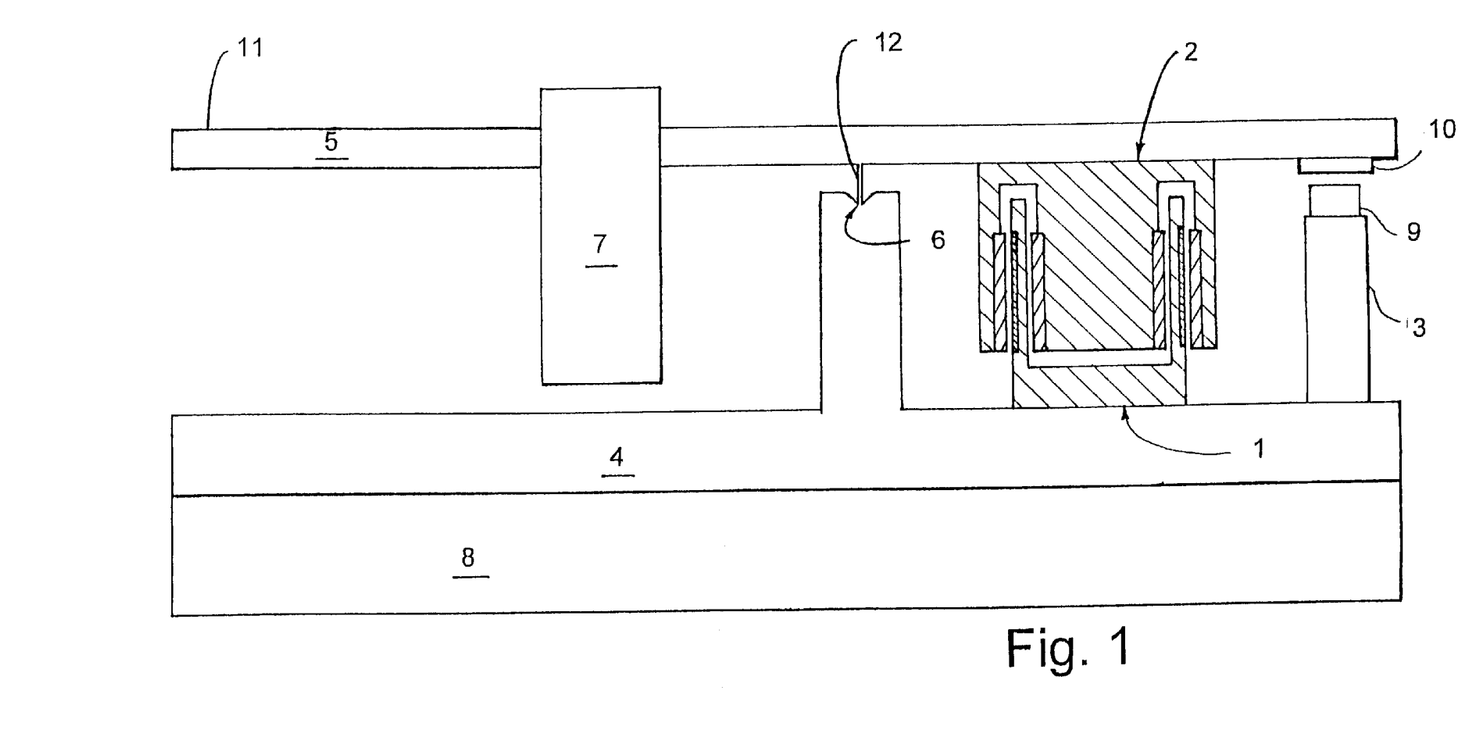
FIG. 1 is a diagrammatic view of the novel apparatus according to a first embodiment.

Referring to FIG. 1, the mechanical structure of the force transducer is shown according to a first embodiment having a voice coil actuator (VCA) with an external position sensor, a balance beam construction and a passive vibration isolator.

The VCA consists of a coil 1 and cooperative magnet assembly 2 which may contain more than one permanent magnet. A non-contact type position sensor 3 is externally mounted to the assembly base 4. The balance beam construction comprises an elongated balance beam 5, resting on a central pivot point or fulcrum 6 of the balance beam. The counter balance 7 is purposely positioned to exactly balance the weight of magnet assembly 2. The system accurately measures tiny quantities of material in high speed operations, e.g., as for filling of powders and liquids into containers. A passive vibration isolator layer 8 is mounted beneath the assembly base 4 to rest on a suitable support (not shown) in order to isolate the balance beam assembly from high frequency vibrations.

The fundamental operation principle of the VCA is based upon the inherent characteristic of the VCA, i.e., the force generated by the VCA is directly proportional to the current applied to the coil of the VCA, and the force applied by the VCA equals the force applied to the balance beam tending to move it. A commercially available VCA which was used for experimentation is Model No. LA15-16-001A linear actuator of BEI Motion Systems Co., San Marcos, Calif. A VCA type LA09-08-000, also commercially available from BEI Motion Systems Co., could likewise be employed. When a mass to be weighed is placed on an end of the balance beam 5, the movement of beam 5 is sensed by position sensor 3. This movement, as well as any neutral current through the coil 1 of the VCA, are used as feedback to a controller which changes the amount of current through the coil to rapidly produce a force in an amount sufficient to counter the torque applied by the mass. Therefore, by measuring the current applied to the coil, the amount of applied force is known, i.e., the weight of the applied mass can be determined. A non-contact position sensor is proposed for the feedback transducer so that no friction is involved. One type of sensor is the laser type set forth, for example, in Patent No. 4,802,541. A position sensor used in experimentation was known as a Model 3300, 8 mm Bentley Nev. proximity transducer system. The Model No. 7200 with button probe, also made available from Bentley Nev., could likewise be employed as the position sensor.

The passive isolator layer 8 beneath the apparatus isolates the balance beam from high frequency vibrations in the environment. This isolator may be of conventional materials, e.g., resilient polymeric material. The construction of the balance beam assembly itself acts to isolate low frequency vibrations. That is, when the beam is balanced about fulcrum 6, the center of mass of the beam assembly is located on a vertical line passing through the fulcrum. Therefore, vertical motion of assembly base 4 caused by low frequency vibration will not produce a torque about the fulcrum, i.e., pivot point. The result is that any movement of the assembly base 4 due to low frequency vibration will cause the same movement of the balanced beam assembly, and because there is no relative motion between the VCA coil assembly 1 and the magnet assembly 2, the current of the coil will not change. Hence the force, e.g., mass reading, will not be affected. With the center of mass of the beam assembly exactly at the pivot point, motion in any direction will not have an effect on the weight reading.

The main components of the prototype force transducer structure, namely the beam assembly and the base assembly, were constructed primarily of aluminum due to weight considerations and for ease of machining, but could also be constructed of steel. It is desired to keep the weight to a minimum in order to keep the inertia of the beam as low as possible. The exceptions to the use of aluminum were the steel utility knife blade used for the pivot part of the counter balance, and the steel target for the position sensor. In the experimental embodiment, balance beam 5 was actually constructed of two pieces of aluminum connected to the utility knife blade 12. The knife blade in the V slot of the pivot support 6 was used for the fulcrum or pivot so that there would be negligible friction or damping associated with the pivot. The knife blade can also be arc-shaped on a flat pad.

The VCA magnet 2 was attached to one end of the balance beam. It was aligned directly above the VCA coil 1 by adjusting the location of the pivot support 6. Coil 1 was fixedly mounted on base 4. On the other end of the beam, counter mass 7 was mounted and made adjustable so that it could be readily positioned in the proper place to exactly balance the beam. Screws on the counter mass were used for fine tuning.

A square piece of 4140 steel 10 was located on the beam directly above the position sensor 3. The position sensor was calibrated and was more accurate with this ferrous material for the sensor target. The position sensor probe placement was adjustable for set up purposes.

Figure 2:
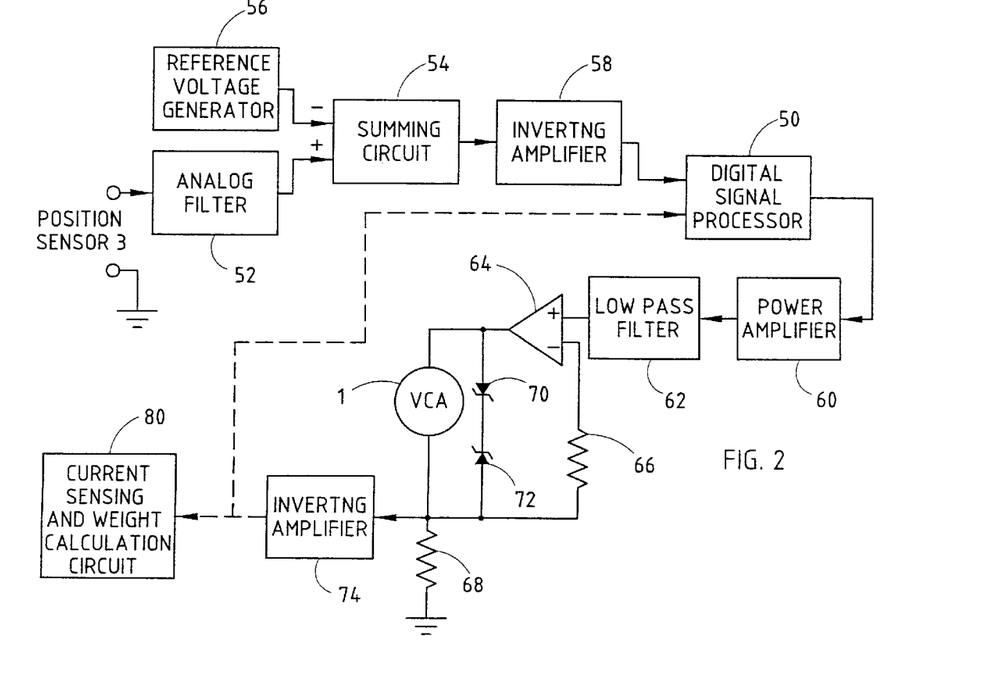
FIG. 2 is a schematic electrical diagram for the system.

An example of the circuitry that may be used for controlling the current supplied to VCA 1, sensing the current through VCA 1, and sensing the output of position sensor 3 is shown in FIG. 2. As will be explained below, a digital signal processor (DSP) 50 serves as the controller that processes the signals from position sensor 3 and a signal representing the current flowing through VCA 1 to determine and supply the appropriate control signal needed to vary the current supplied to VCA 1 to balance the scale. As discussed above, DSP 50 can determine whether the scale is balanced by monitoring the voltage output by position sensor 3.

As shown in FIG. 2, the output of position sensor 3 is passed through an analog filter 52, which is provided for the purpose of filtering the high frequency signal which is inherently produced by position sensor 3. The filtered output of position sensor 3 is then applied to a summing circuit 54 which sums the voltage level of the applied signal with a reference voltage output from a reference voltage generator 56. For simplicity, the reference voltage output from reference voltage generator 56 is equal to the opposite of the voltage normally output from position sensor 3 when the scale is balanced. In this manner, the output voltage of summing circuit 54 is set at zero when the scale is balanced. It will be appreciated by those skilled in the art, however, that summing circuit 54 could be replaced with a differential circuit and that the reference voltage supplied by reference voltage generator 56 could be equal to that output by position sensor 3 when the scale is balanced.

The output voltage signal from summing circuit 54 is then supplied to DSP 50 through an inverting amplifier 58. DSP 50 is preferably implemented in a DSP board of a personal computer, such as a DSPACE 1102 digital signal processing board. Such a DSP board typically includes an analog to digital converter for converting the input analog values to digital values on the input end and further includes a digital to analog converter on the output end for converting the digitally processed signals into an analog current control signal.

The output of DSP 50 is amplified by a power amplifier 60 and filtered by a low-pass filter 62 in order to amplify the current needed to drive VCA 1 and to prevent the current supplied to VCA 1 from jumping instantaneously from one step to another as a result of the inherent step signal resulting from the digital to analog converter on the DSP board. The current control signal output from filter 62 is applied to the positive terminal of an operational amplifier 64 which has its output terminal connected to VCA coil 1. The negative terminal of operational amplifier 64 is connected to the other end of VCA coil 1 through a resistor 66. The circuit also includes two Zener diodes 70 and 72 coupled between the ends of VCA coil 1.

The current flowing through VCA 1 is measured by sensing the voltage across a precision one ohm resistor 68 that is coupled between ground and one end of VCA coil 1. As such, the voltage across resistor 68 is proportional to the current flowing through VCA 1. By connecting the negative terminal of operational amplifier 64 to resistor 68 through resistor 66, an inner current feedback loop is provided.

VCA coil 1 is also in the feedback path so that the current drawn across the 1 ohm resistor 68 also passed through VCA coil 1. Thus, the electrical characteristics of the VCA such as the resistance and inductance of the coil are part of the inner current feedback loop. However, these electrical characteristics can be neglected because of the high bandwidth of this loop with respect to the outer loop. Although instantaneous change in current across an inductor is impossible, use of the inner current feedback loop causes the current to follow the voltage signal closely.

The voltage across resistor 68 is amplified by an inverting amplifier 74 and applied to an input terminal of DSP 50. Inverting amplifier 74 is used for a similar purpose as inverting amplifier 58 in that it amplifies the signal to better utilize the resolution of the analog to digital converters in DSP 50. Alternatively, the output of inverting amplifier 74 may be applied to a current sensing and weight calculation (CSWC) circuit 80.

In operation, DSP 50 monitors the output of position sensor 3 to determine whether the voltage at this input is any value other than zero. If the voltage at this input terminal is greater or less than zero, DSP will accordingly increase or decrease the voltage level of its output current control signal supplied to power amplifier 60. This signal is then amplified, filtered, and passed through operational amplifier 64 to supply an increasing or decreasing amount of current to VCA 1. As explained above, such a change in current will counter the force of any object that is to be weighed by the scale. By continually monitoring the voltage at the input terminal connected to position sensor 3, DSP 50 makes the appropriate adjustments to the current supplied to VCA 1 so as to move the scale back to a position whereby the input voltage received from inverting amplifier 58 is maintained at zero.

During this procedure, either DSP 50 or CSWC circuit 80 measures the current flowing through VCA 1 by monitoring the sensed voltage across resistor 68. DSP 50 or CSWC circuit 80 may then calculate the weight of the object placed on the scale based upon the voltage received from inverting amplifier 74 which corresponds to the current through VCA 1. The calculated weight of the object may then be stored in memory, applied to another processor for appropriate processing, or displayed on a display which may be the display of a personal computer in which DSP or CSWC circuit is incorporated or the display may be a dedicated display for displaying the weight of the object.

The electronics shown in the schematic diagram in FIG. 2 are preferably soldered to a perforated solder board to reduce some of the electrical noise which tends to be inherent with solderless breadboards and to enhance the performance and accuracy of the force transducer. Electrical noise may also be reduced by enclosing as many of the electrical components as possible in an aluminum box. This includes the proximitor for the position sensor, the −24 volt power supply required for the proximitor, the circuit on the perforated solder board, and the ±15 volt power supply for the circuit. Further, shielded wire for the electrical connections outside of the aluminum box may be used to reduce noise. Shielded wire is preferably used for connection to the VCA. BNC connectors may be mounted on the box for external coaxial cable connections to the DSP board and the data acquisition board.

There were steps taken to insure the best operation of the VCA and the position sensor. The force transducer was assembled in such a way as to utilize the most linear range of the VCA and the position sensor. For the VCA, the magnet assembly was concentric with the coil assembly at midstroke. The most linear range of the position sensor is operation around $1.25 \times 10^{-3}$ meters. The voltage reading for this distance is minus 9 volts. To insure that the force transducer was operating in these linear regions, the following procedure was followed.

A piece of aluminum was machined to the correct thickness to temporarily support the magnet above the coil in midstroke position. To ensure concentricity, plastic shim stock with the same thickness as the radial clearance between the coil and magnet was positioned between the coil and magnet. With the correct relative location of the magnet and coil ensured, and with the knife blade resting properly in the groove, the pivot support is secured to the base.

Before removing the shims or the spacer, the position sensor was installed to insure that the operating region of the VCA would coincide with the operating region of the position sensor. The position sensor location was adjusted so that it would read minus 9 volts (measured directly from the position sensor), which was its mid-range. The trimming potentiometer was then adjusted to offset the minus 9 volts and give a position reading of 0 volts at the input to the DSP board. At this point the shims and spacer were removed and the counterbalance located on the beam so that the steady state position would give a reading of 0 volts. This technique ensured that the force transducer was operating near the midstroke position of the VCA and also mid-range for the position sensor. The force transducer assembly was then fastened to the aluminum base plate which served as a means of fastening the force transducer to either an isolation table or a shaker.

According to the first embodiment, the novel apparatus employs a balance beam supported on a fulcrum to a base. The magnet part of a voice coil actuator is mounted to the beam on either side of the fulcrum. A counterweight is arranged on the beam such that it is statically balanced when force is applied to the beam. The fulcrum can be knife edge, a rocker, or a pivot bearing. Also on the base, in a fixed mount condition, is the coil forming the other part of the voice coil actuator, aligned with the magnet to be cooperative with the magnet, but out of engagement with the magnet. A non-contact position sensor on the base detects movement of the balance beam from a preset position. This movement is in response to a force applied to the beam such as by the applied weight of a quantity of material to be weighed. A control system applies an electric current to the coil in an amount responsive to the amount of sensed beam movement, to maintain the beam at the preset position. This current is measured and preferably converted to force units, such as weight units. The balance beam arrangement assures accurate alignment between the magnet and the coil of the voice coil actuator so as to prevent contact therebetween. The novel apparatus and method are particularly accurate, rapid and useful for repeatedly, successively verifying the weight of items or materials having an expected, i.e., predetermined, weight value.

The novel apparatus and method do not necessitate an accelerometer to operate effectively. The movement is typically only a minute amount, e.g., $0.5 \times 10^{-5}$ meters from the balance point, so that the force is quickly and accurately measured by the current value reading. The small movement is also advantageous when using a VCA since VCAs have a non-linear force constant for larger displacements.

In operation, the balance beam is ideally suited to repeatedly, rapidly and successively measure weights, i.e., forces of an expected amount, as for verifying weight of items or material of a predetermined value, so that the beam will be totally in balanced condition after the weight is applied. The object is applied to the balance beam at a designated test location 11 (FIG. 1) on the end of the beam opposite the VCA.

The resulting balance beam pivotal movement occurring, and detected by the sensor, results in a controlled electrical current amount flowing to the coil to create an equal but opposite force to thereby balance the beam and cause it to be at the preset position relative to the sensor. The current value is measured and preferably interpreted directly into units of force, e.g., weight. The measurement is so rapid, i.e., a fraction of a second, that repetition of measurement on successive units in a high speed production operation is possible.

Added damping is preferably electronic so as to largely avoid undesirable, inherently passive, mechanical damping. In contrast to the passive damping and vibration isolation of the prior art, the present invention can effect active response with an electronic control system. To minimize low-frequency vibrations (e.g., frequencies below about 80 Hz), an accelerometer (not shown) may be mounted on base 4 of the high speed weighing system to obtain vibration measurements at the base 4. The vibrations measured at base 4 are treated as disturbance and may be canceled out in real time as error to be compensated for through use of a closed-loop control circuit and algorithm.

Figures 3, 4, 5:
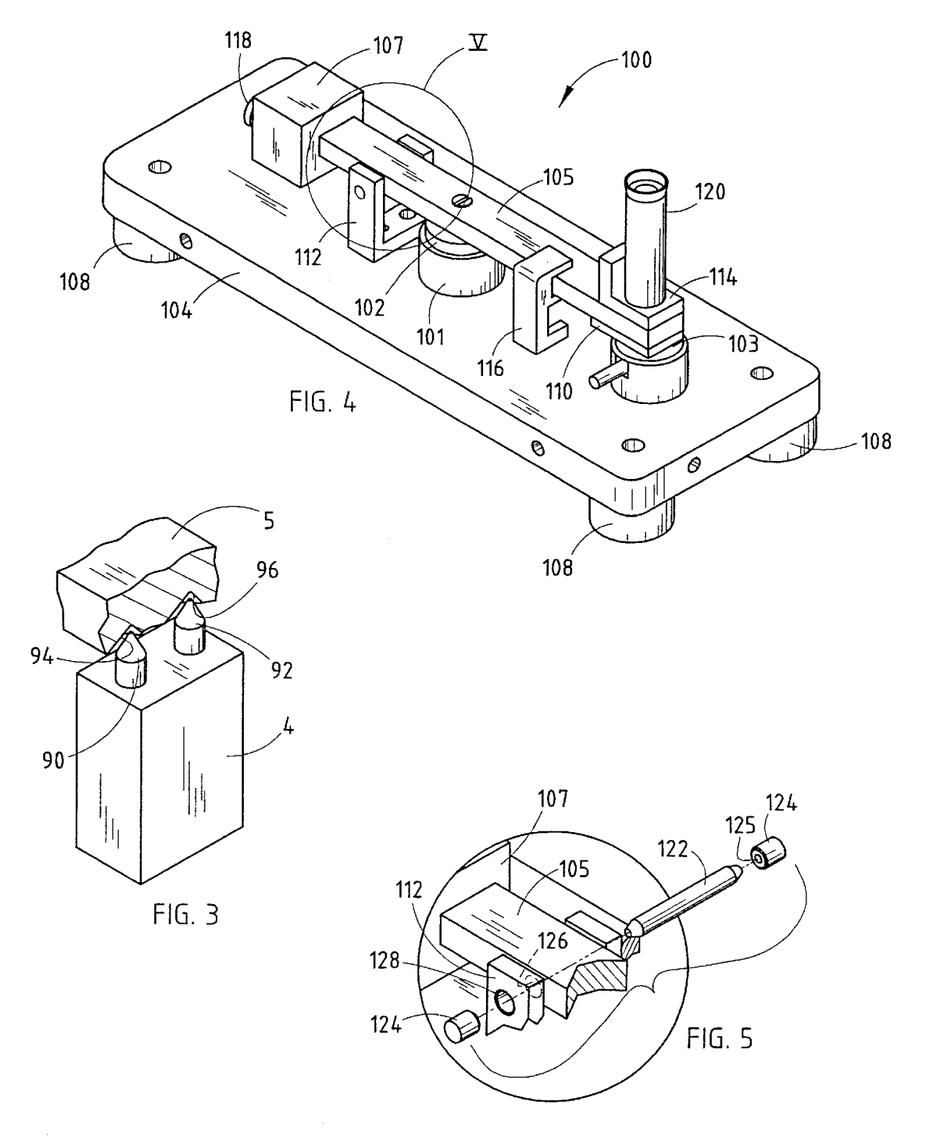
FIG. 3 is an enlarged view of the balance beam pivotally mounted to the base according to an alternate beam pivot assembly.
FIG. 4 is a perspective view of a force transducer according to a second embodiment of the present invention.
FIG. 5 is an enlarged partial exploded view of the beam pivot assembly shown in FIG. 4.

Referring now to FIG. 3, the elongated balance beam 5 is shown pivotally mounted to assembly base 4 by way of a pair of vertical pins 90 and 92 each having conical ends and mounted to assembly base 4 in accordance with an alternate beam pivot mount arrangement. The conical ends of vertical pins 90 and 92 engage conical dimples 94 and 96 formed in the bottom surface of balance beam 5. The conical dimples 94 and 96 are each formed as a conical-shaped hole extending into the bottom surface of beam 5 and having an angular opening greater than the angle of the cone-shaped ends of pins 90 and 92 such that the tip of each pin contacts a minimal area in the corresponding cone-shaped hole and each of pins 90 and 92 allow low friction pivotal movement of beam 5. Accordingly, the balance beam 5 is supported via two vertical pins 90 and 92 which provide horizontal constraint of beam 5 relative to pins 90 and 92 and allow ease of pivotable rotation of balance beam 5 about its lateral axis with very low beam pivot friction.

Referring to FIG. 4, a balance beam style force transducer 100 is illustrated according to a second embodiment of the present invention. Force transducer 100 likewise includes an elongated balance beam 105, a voice coil actuator (VCA), a counter-balance weight 107, and an external position sensor 103. According to this second embodiment, force transducer 100 has a U-shaped beam pivot mount assembly 112 for pivotally mounting the elongated balance beam 105 such that beam 105 may pivot about its lateral axis. The voice coil actuator likewise includes an electrically conductive coil 101 and a cooperative magnet assembly 102 as was described in connection with the first embodiment. However, according to the second embodiment, the voice coil actuator is located on the same side of the beam pivot mount assembly 112 as the object to be weighed.

A non-contact type position sensor 103 is externally mounted to the assembly base 104 preferably at the outer end of balance beam 105 and below the object to be weighed. Sensor 103 may include the same type of sensor as described in connection with the first embodiment. A sensing target made up of a square piece of steel 110 is located on the bottom surface of beam 105 directly above the position sensor 103. The counter-balance weight 107 is purposely positioned to exactly balance the weight of the balance beam 105 about the beam pivot mount assembly 112 during either a loaded or unloaded condition. Counter-balance weight 107 includes a weight adjusting screw or bolt 118 that is adjustable for fine tuning the balance position of the elongated balance beam 105.

The assembly base 104 rests on four passive vibration isolators 108 located at each of the four corners for isolating the force transducer, and particularly the balance beam, from high-frequency vibrations (e.g., frequencies above approximately 200 Hz) that may be present in the environment. Passive vibration isolators 108 may include a visco-elastic or other resilient polymeric material assembled to the bottom side of base 104.

The balance beam 105 is preferably made of a lightweight high stiffness material. Particularly, beam 105 is preferably made of ceramic, containing approximately 99.5% alumina ($Al_2O_3$). Ceramic material has half the density and double the strength of steel, and provides good thermal stability and dielectric capability. The lightweight characteristics provide for enhanced responsiveness of beam 105, while the high stiffness minimizes beam deflection and offers a high natural frequency. According to the preferred embodiment, it is preferred that the natural frequency of beam 105 be greater than or equal to 600 Hz in order to avoid resonance in which the system has a maximum bandwidth of 400 Hz. The high natural frequency of beam 105 thereby avoids the possibility of causing resonance and allows higher system bandwidth with an increased speed. Thus, the beam acts as a mechanical filter, damping vibrations less than 600 Hz. This is important because the system cannot be easily isolated from mechanical vibrations less than 200 Hz. Therefore, the system of the present invention has been designed to be non-responsive to these vibrations.

The balance beam 105 has a receiving pad, which may include a holding platform 114, located on the top surface at one end of beam 105 for holding an object, such as can 120, to be weighed. Platform 114 preferably provides a surface upon which objects to be weighed are placed such that the center of mass of the object is located substantially at the same location for repeated force measurements. In addition, a beam travel limiter 116 limits the vertical travel of elongated balance beam 105 via upper and lower limit arms.

According to the second embodiment of the present invention, force transducer 100 provides both the voice coil actuator and the object to be weighed on the same side of the beam pivot mount 112. This allows for utilization of a shortened beam length, while maintaining substantially the same weight amplification ratio α. By relocating the voice coil actuator and balance weight according to the second embodiment, the force transducer 100 can achieve a 12% shorter balance beam and 40% reduction in bending movement, as compared to the first embodiment, while maintaining the same weight amplification ratio. In addition, the force transducer 100 realizes a reduction in the maximum bending moment, and therefore a reduction in the amount of beam deflection that may otherwise be experienced. Further, with the position sensor 103 positioned immediately underneath the platform 114 and the object 120 to be weighed, the maximum sensing range may be realized.

The force transducer 100 may be assembled and operated to provide a balanced beam 105 either during a loaded condition or, alternately, during an unloaded condition. Under the loaded condition, the elongated balance beam 105 is balanced horizontally about the beam pivot mount assembly 112 when an expected nominal amount of weight to be weighed is applied to platform 114. The balancing calibration may be achieved by applying a suitable amount of counter-balance weight 107 at an appropriate position on beam 105 and fine-tuning the weight adjustment via weight adjusting bolt 118. A balanced beam realized during a loaded condition offers the advantage of enhanced vibration rejection capability, particularly low-frequency vibration rejection, since vertical motion of the assembly base 104 caused by low-frequency vibration generally will not produce a torque about the beam pivot mount assembly 112, due to the balanced condition. In addition, a higher measurement resolution may also be achieved with the beam 105 balanced during a loaded condition. The loaded condition balance beam provides a higher measurement resolution, and in effect measures the change in force from a desired nominal value in contrast to the overall force applied by an object to be weighed.

Alternatively, the force transducer 100 may be provided in a balanced state during an unloaded condition such that the elongated balance beam 105 is balanced when no force is applied to the platform 114. The unloaded balanced condition provides a measurement of the actual force applied by the object to be weighed and may be implemented with a lighter counterweight to provide a lighter overall force transducer. The lighter weight allows for a faster responsiveness due to a decrease in settling time.

With particular reference to FIG. 5, the beam pivot mount assembly 112 is further illustrated in more detail. Beam pivot mount assembly 112 employs a cylindrical pin 122 having conical-shaped tips on opposite ends. The pin 122 extends through a bore 126 formed laterally through elongated balance beam 105. Opposite ends of pin 122 each engage a widened, conical-shaped groove in shaft holder bearings 124, each of which are housed in openings 128 of the U-shaped bracket. Pin 122 may include a sapphire shaft and provides both horizontal and vertical constraints to beam 105, while allowing ease of pivotable rotation of beam 105 about the axis of pin 122 with low beam pivot friction.

Figure 6:
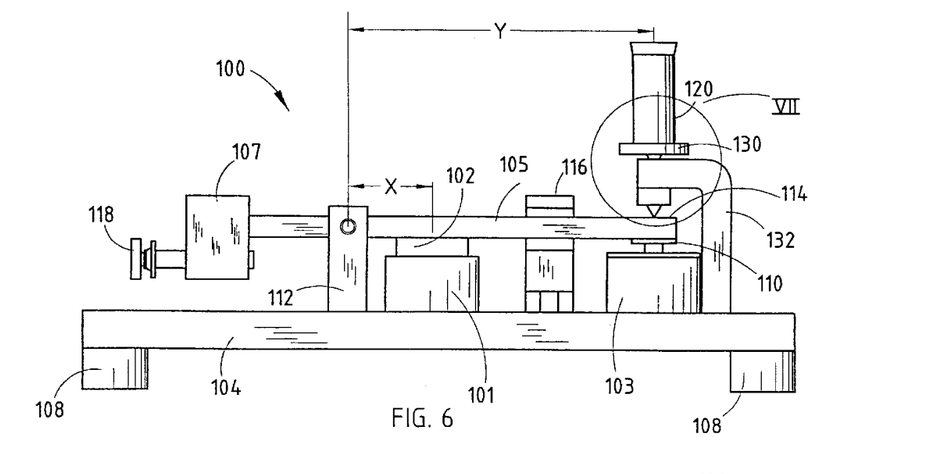
FIG. 6 is a perspective side view of the force transducer of FIG. 4 further illustrating a low-friction force concentration assembly for applying position independent force to be weighed to the balance beam.

Referring to FIG. 6, the force transducer 100 is illustrated further utilizing a plunger-like force concentration assembly for accurately applying the center of mass of an object to be weighed to beam 105. According to the present invention, it is preferred that the object to be weighed, such as can 120, be located so that the force of the object to be weighed is applied to a predetermined point on elongated balance beam 105. An accurate distance Y can therefore be maintained between the beam pivot mount assembly 112 and the center of mass of the object to be weighed for repeated force measurements.

It is also shown that the distance between the beam pivot mount assembly 112 and the central force applied by the voice coil actuator is referenced as distance X. A relationship of distances Y and X may be provided as a ratio a according to the following equation $$\alpha = \frac{Y}{X}.$$

In order to magnify the object weight, it is desired to maximize the ratio α. Contrarily, in order to reduce the overall length and weight of the force transducer 100, it is desirable to minimize ratio α. As a compromise to object weight magnification and reduction of length and weight, the force transducer 100 of the present invention preferably realizes a ratio α of distance Y divided by distance X in the range of 1.6 to 9.2. More particularly, force transducer 100 is more preferably provided such that ratio α is equal to approximately four (α=4).

Figure 7:
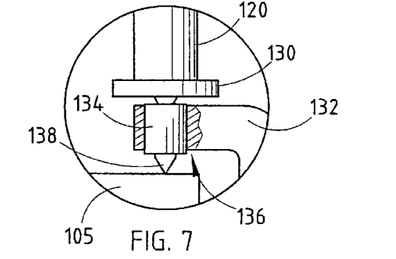
FIG. 7 is an enlarged view of a portion of the force concentration assembly of FIG. 6.

Referring more particularly to FIG. 7, the plunger-like force concentration assembly of force transducer 100 is shown in more detail. The force concentration assembly includes an L-shaped support arm 132 mounted to base assembly 104 for positioning a holding platform 130 near the outer end of beam 105. The force concentration assembly includes a low friction linear bearing 134 extending vertically through a bore 136 in arm 132. The force concentration assembly further includes a pin 138 having a round tip extending downward from linear bearing 134 for contacting the top surface of elongated balance beam 105 within a small area, and preferably at a point, to apply the entire force from the force concentration assembly and any object located therein to be weighed vertically downward to a point on beam 105. The force concentration assembly is substantially position independent in that it causes the force applied by the object to be weighed to be focused onto a point on beam 105, regardless of the object's location on platform 130. According to one example, linear bearing 134 may include a ceramic-coated aluminum cylinder having a low-friction coefficient.

Figure 8:
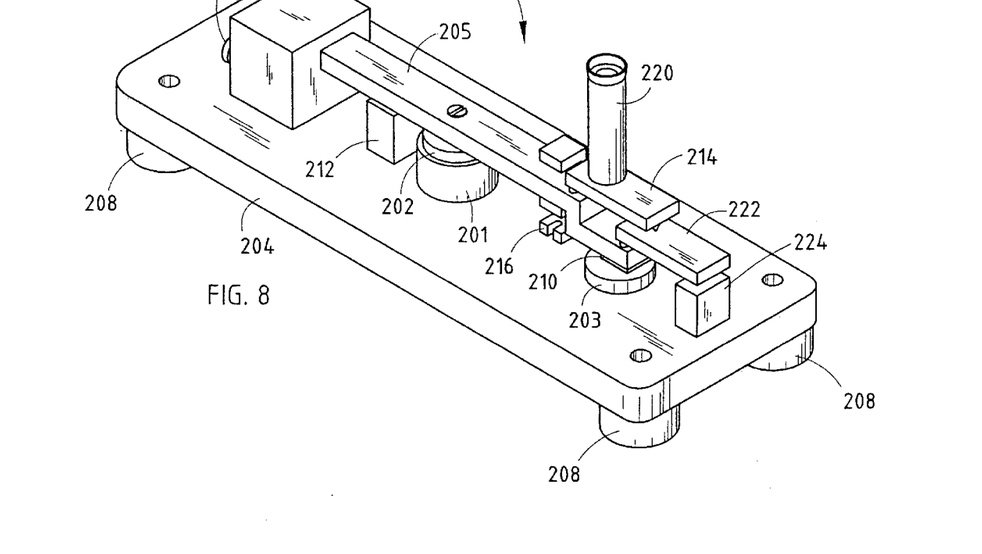
FIG. 8 is a perspective view of a force transducer employing a pair of balance beams according to a third embodiment of the present invention.

Referring to FIG. 8, a third embodiment of a force transducer 200 is shown having two balance beams 205 and 222. The double-beam force transducer 200 has an assembly base 204 assembled on four passive vibration isolators 208. The first balance beam 205 is pivotally mounted on a first beam pivot mount assembly 212 and has a counter-balance weight 207 with a weight adjusting screw or bolt 218 located on one end thereof.

Balance beam 205 has a voice coil actuator made up of an electrically conductive coil 201 and a cooperative magnet assembly 202 located on the same side of pivot mount assembly 212 as the object to be weighed with the counter-balance weight 207 located on the opposite side. A limiter 216 is also included to limit the vertical travel of beam 205.

The first balance beam 205 has an upper flat surface and a lowered flat surface extending at one end thereof. On the outer end of the lowered flat surface of beam 205 rests one end of the second balance beam 222. The second balance beam 222 is preferably shorter than beam 205 and is balanced on its other end about a second beam pivot mount assembly 224. A platform 214 for holding an object to be weighed, such as can 220, is positioned on top of both the first balance beam 205 and the second balance beam 222. More particularly, one end of platform 214 rests on the upper flat surface of balance beam 205, while the opposite end of platform 214 rests on one end of the second balance beam 222. Accordingly, force transducer 200 is substantially position independent in that an object to be weighed may be located at various locations on platform 214 without substantially affecting the accuracy of the force to be measured via force transducer 200. According to this embodiment, the position sensor 203 is preferably mounted below the outermost end of the first elongated balance beam 205 to provide the highest maximum measurement resolution.

Figure 9:
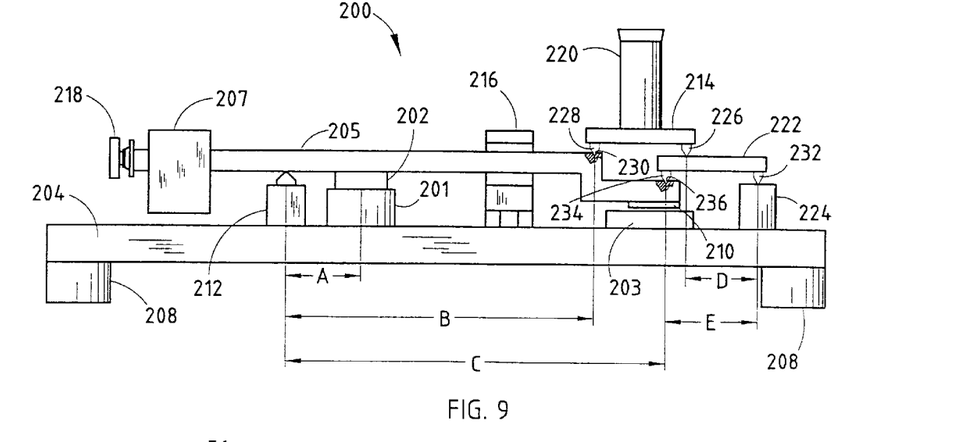
FIG. 9 is a perspective side view of the double-beam force transducer shown in FIG. 8.

Referring particularly to FIG. 9, it should be appreciated that holding platform 214 has vertical pins 228 and 226 connected to the bottom surface thereof and in contact with the top surface of respective balance beams 205 and 222. Pin 228 may include two pins for lateral stability, each of which matingly engages a conical dimple 230 formed in the top surface of beam 205 so that pin 228 and platform 214 do not slide horizontally relative to beam 205. Contrarily, vertical pin 226 rests on the flat surface of beam 222 and may slide thereon.

The second balance beam 222 also has vertical pins 234 connected to the bottom surface thereof. Vertical pins 234 may include two pins for lateral stability, each of which engages a conical dimple 236 formed in the top surface of the lowered surface of beam 205 so as to prevent longitudinal sliding thereon. The opposite end of second balance beam 222 rests on the second beam pivot mount assembly 224 and may include a fulcrum or other pivoting assembly as described herein or as otherwise known in the art to allow beam 222 to pivot about a lateral axis.

The double-beam force transducer 200 may include dimensions, such as length A defining the distance between first beam pivot mount assembly 212 and the essential opposing central force applied by the voice coil actuator. Dimension B defines the distance between first beam pivot mount assembly 212 and vertical pin 228. Dimension C defines the distance between first beam pivot mount assembly 212 and vertical pin 236. Dimension D defines the distance between vertical pins 226 and 232. Dimension E defines the distance between vertical pins 236 and 232. Given the above-identified dimensions, it is preferred that the double-beam force transducer 200 be designed with dimensions such that $$B = \frac{D}{E} \times C.$$

Additionally, a relationship of dimension B to dimension A which is the distance between the first pivot mount assembly and the central force applied by the voice coil actuator may be provided as ratio α=B/A. As described above, it is preferred to provide a ratio of dimension B divided by dimension A in the range of 1.6 to 9.2, and has an optimum value of approximately four.

Accordingly, the double-beam force transducer 200 allows the object to be weighed to be placed anywhere on platform 214 without substantially affecting the accuracy of the force transducer 200. In addition, the force transducer as described in the aforementioned embodiments provides high accuracy force measurements in a rapidly stabilizing system that will measure the weight or force of an object or objects at high speed. The force transducers as disclosed herein have been optimized to reduce vibration affect, increase force measurement resolution, reduce system equivalent mass, and increase position measurement resolution.

Conceivably those in this technology will consider variations of the unique development to suit particular circumstances and operations. The invention is not intended to be limited to the preferred exemplary embodiment described, but only by the appended claims and the equivalents thereto.

The invention claimed is:

1. A force transducer comprising:

a base;

a balance beam having first and second ends, said balance beam being supported on said base about a pivot mount assembly between said first and second ends of said balance beam;

an electrically conductive coil and a magnet located on a first side of said pivot mount assembly intermediate said first end and said pivot mount assembly and capable of providing a first force to said balance beam;

a counterweight mounted on said balance beam on a second side of said pivot mount assembly and arranged on said balance beam to meet a balanced position;

a beam position sensor for detecting balance beam movement from the balanced position by a second force applied to said balance beam;

a receiving pad provided on said balance beam on said first side of said pivot mount assembly for receiving an object to be weighed, wherein said receiving pad, balance beam, and coil are arranged to provide a ratio $\alpha$ of Y/X in the range of 1.6 to 9.2, wherein Y is the distance between the pivot mount assembly and an object to be weighed and X is the distance between said pivot mount assembly and said electrically conductive coil;

a control system associated with said beam position sensor and said electrically conductive coil and responsive to said beam position sensor for supplying an electric current through said electrically conductive coil in an amount sufficient to maintain said balance beam at said balanced position; and a current detector for measuring the amount of current supplied and thereby the amount of force.

2. The force transducer as defined in claim 1, wherein said ratio $\alpha$ of Y/X is substantially equal to 4.

3. The force transducer as defined in claim 1, wherein said balance beam is statically balanced about the pivot mount assembly when said platform is unloaded.

4. A force transducer comprising:

a base;

a balance beam having first and second ends, said balance beam being supported on said base about a pivot mount assembly between said first and second ends of said balance beam, wherein said pivot mount assembly comprises a rotatable pin extending laterally through said balance beam for rotating said balance beam about said rotatable pin;

an electrically conductive coil and a magnet located on a first side of said pivot mount assembly intermediate said first end and said pivot mount assembly and capable of providing a first force to said balance beam;

a counterweight mounted on said balance beam on a second side of said pivot mount assembly and arranged on said balance beam to meet a balanced position;

a beam position sensor for detecting balance beam movement from the balanced position by a second force applied to said balance beam;

a receiving pad provided on said balance beam on said first side of said pivot mount assembly for receiving an object to be weighed;

a control system associated with said beam position sensor and said electrically conductive coil and responsive to said beam position sensor for supplying an electric current through said electrically conductive coil in an amount sufficient to maintain said balance beam at said balanced position; and a current detector for measuring the amount of current supplied and thereby the amount of force.

5. The force transducer as defined in claim 4, wherein said rotatable pin includes conical tips on opposite ends for engaging cone-shaped slots.

6. The force transducer as defined in claim 5, wherein said rotatable pin comprises a ceramic bearing.

7. The force transducer as defined in claim 1, wherein said pivot mount assembly comprises a pair of vertical pins having conical tips for engaging cone-shaped slots formed in a bottom side of said balance beam.

8. A force transducer comprising:

a base;

a balance beam having first and second ends, said balance beam being supported on said base about a pivot mount assembly between said first and second ends of said balance beam, wherein said balance beam comprises a ceramic material;

an electrically conductive coil and a magnet located on a first side of said pivot mount assembly intermediate said first end and said pivot mount assembly and capable of providing a first force to said balance beam;

a counterweight mounted on said balance beam on a second side of said pivot mount assembly and arranged on said balance beam to meet a balanced position;

a beam position sensor for detecting balance beam movement from the balanced position by a second force applied to said balance beam;

a receiving pad provided on said balance beam on said first side of said pivot mount assembly for receiving an object to be weighed;

a control system associated with said beam position sensor and said electrically conductive coil and responsive to said beam position sensor for supplying an electric current through said electrically conductive coil in an amount sufficient to maintain said balance beam at said balanced position; and a current detector for measuring the amount of current supplied and thereby the amount of force.

9. The force transducer as defined in claim 1, further comprising a passive vibration isolator connected to said base for isolating said base from high frequency vibrations.

10. The force transducer as defined in claim 1, further comprising a force concentration assembly provided on said balance beam on said first side of said pivot mount assembly and including a linear bearing vertically disposed in a support member and having a platform for receiving an object to be weighed and a small-area contact tip for contacting a small area on said pad on said balance beam, wherein said force applied to said platform is substantially concentrated to said small-area contact on said beam.

11. The force transducer as defined in claim 1, wherein said beam position sensor is located substantially at said first end of said balance beam.

12. A force transducer comprising:

a base;

a balance beam having first and second ends, said balance beam being supported on said base about a pivot mount assembly between said first and said second ends of said balance beam;

an electrically conductive coil and a magnet capable of providing a force to said balance beam;

a counterweight mounted on said balance beam and arranged on said balance beam to meet a balanced condition;

a beam position sensor for detecting balance beam movement from its preset position by a force applied to said balance beam;

a force concentration assembly including a support arm mounted to said base and a linear bearing vertically disposed through a bore in said support arm and substantially free to move in a vertical direction, said force concentration assembly further including a platform mounted to said linear bearing and a small-area contact tip in contact with said balance beam, wherein an object to be weighed is disposed on said platform and force thereof is concentrated to said balance beam via said small-area contact tip;

a control system associated with said sensor and said electrically conductive coil and responsive to said sensor for supplying an electric current through said electrically conductive coil in an amount sufficient to maintain said balance beam at said preset position; and a current detector for measuring the amount of current supplied and thereby the amount of force.

13. The force transducer as defined in claim 12, wherein said small-area contact tip of said force concentration assembly comprises a round tip.

14. The force transducer as defined in claim 12, wherein said counterweight is mounted on one side of said balance beam, while said electrically conductive coil and magnet and force concentration assembly are mounted on an opposite side of said balance beam relative to said pivot mount assembly.

15. The force transducer as defined in claim 12, further comprising a ratio a of Y/X in the range of 1.6 to 9.2, wherein Y is the distance between said pivot mount assembly and the object to be weighed and X is the distance between said pivot mount assembly and said electrically conductive coil.

16. The force transducer as defined in claim 15, wherein said ratio a of Y/X is substantially equal to 4.

17. The force transducer as defined in claim 12, wherein said pivot mount assembly comprises a rotatable pin extending laterally through said elongated balance beam for rotating said balance beam about said rotatable pin.

18. The force transducer as defined in claim 12, wherein said beam position sensor is located substantially at said first end of said balance beam and below said force concentration assembly.

19. A multiple beam force transducer comprising:

a base;

a first balance beam having first and second ends, said balance beam being supported on said base at a first pivot mount assembly between said first and second ends;

a second balance beam having first and second ends, said second balance beam being supported at a second pivot mount assembly, and said second balance beam contacting said first balance beam on a first side of said first pivot mount assembly;

a platform for receiving an object to be weighed, said platform applying force to said first balance beam and said second balance beam;

an electrically conductive coil and a magnet capable of applying a force to said first balance beam;

a counterweight mounted on said first balance beam on a second side of the first pivot mount assembly;

a beam position sensor for detecting movement of said first balance beam from its preset position by a force applied to said platform;

a control system associated with said sensor and said electrically conductive coil and responsive to said sensor for supplying an electric current through said electrically conductive coil in an amount sufficient to maintain said first balance beam at said preset position; and a current detector for measuring the amount of current so supplied and thereby the amount of force.

20. The force transducer as defined in claim 19, wherein said electrically conductive coil and magnet and platform are located on one side of said first pivot mount assembly, and said counterweight is located on an opposite side of said first pivot mount assembly.

21. The force transducer as defined in claim 19, wherein said first balance beam is in sliding engagement relative to said second balance beam.

22. The force transducer as defined in claim 19, wherein said first balance beam includes an upper surface and a lowered end, wherein said platform applies force to said upper surface of said first balance beam and said second balance beam contacts said lowered surface of said first balance beam.

23. The force transducer as defined in claim 19, wherein said second balance beam is shorter in length than said first balance beam.

24. The force transducer as defined in claim 19, further comprising a ratio $\alpha$ of B/A in the range of 1.6 to 9.2, wherein B is the distance between said first pivot mount assembly and the location in which force of an object is applied to said first balance beam, and A is the distance between said first pivot mount assembly and said electrically conductive coil.

25. The force transducer as defined in claim 24, wherein said ration a of B/A is substantially equal to 4.

* * * * *